United States Patent [19]
Cohen et al.

[11] Patent Number: 5,600,253
[45] Date of Patent: Feb. 4, 1997

[54] ELECTROMAGNETIC WAVE REFLECTIVE TYPE, LOW COST, ACTIVE PROXIMITY SENSOR FOR HARSH ENVIRONMENTS

[75] Inventors: Leonard D. Cohen, Brooklyn; Scott M. Weiner, Great Neck; Henry C. Paczkowski, Woodside, all of N.Y.; Joseph C. Zuercher, Brookfield, Wis.

[73] Assignees: Eaton Corporation at Eaton Center, Cleveland, Ohio; AIL Systems, Inc., Deer Park, N.Y.

[21] Appl. No.: 436,705

[22] Filed: May 8, 1995

[51] Int. Cl.[6] .................................................. G01R 27/00
[52] U.S. Cl. ............................................. 324/644; 342/27
[58] Field of Search ...................................... 324/642, 644, 324/645, 637, 646; 342/27, 134, 127, 128, 458, 118

[56] References Cited

U.S. PATENT DOCUMENTS

| | | | |
|---|---|---|---|
| 4,052,666 | 10/1977 | Fletcher et al. | 324/644 |
| 4,075,555 | 2/1978 | Wight et al. | 324/585 R |
| 4,384,819 | 5/1983 | Baker | 324/644 |
| 4,475,089 | 10/1984 | Kahnke | 331/65 |
| 4,833,918 | 5/1989 | Jean et al. | 73/290 V |
| 4,862,061 | 8/1989 | Damon | 324/58.5 |
| 4,901,083 | 2/1990 | May et al. | 342/128 |
| 5,177,445 | 1/1993 | Cross | 324/637 |
| 5,459,405 | 10/1995 | Wolff et al. | 324/644 |

*Primary Examiner*—Sandra L. O'Shea
*Assistant Examiner*—Raymond Y. Mah
*Attorney, Agent, or Firm*—Hoffmann & Baron

[57] ABSTRACT

A low power, low cost, millimeter wave (MMW) proximity sensor that provides over a 6:1 increase in minimum detection range (55 mm minimum) compared to standard 18 mm inductive proximity sensors preferably includes a low cost MMW Gunn oscillator, MMW detector and analog processing/driver circuitry. The sensor is preferably designed for 3-wire operation and will fit in a standard 18 mm tube.

1 Claim, 13 Drawing Sheets

A ——— MAIN TRANSMITTER SIGNAL
B ——— REFLECTED SIGNAL FROM TARGET
C ----- REFLECTED TRANSMITTER SIGNAL FROM SPLITTER
D ----- LEAKAGE SIGNAL

ELECTROMAGNETIC WAVE REFLECTIVE TYPE, LOW COST, ACTIVE PROXIMITY SENSOR FOR HARSH ENVIRONMENTS

BACKGROUND AND SUMMARY OF THE INVENTION

This invention is directed to an electromagnetic wave proximity sensor. In the context of this invention, the term "electromagnetic wave" includes both "microwave" and "millimeter wave," as well as other frequencies. Further, in the context of this invention, the term "microwave" refers to a frequency of less than about 30 GHz, and "millimeter wave" refers to a frequency greater than about 30 GHz. In order to keep the size of the proximity sensor as small as possible, the invention preferably operates at frequencies above about 30 GHz (millimeter wave). Hence, the following description of the invention will refer to the proximity sensor as being a "millimeter wave" proximity sensor, in order to simplify the description, but it should be realized that the invention is not limited to frequencies above about 30 GHz, or millimeter waves, and proximity sensors including the features of this invention operating at different frequencies are envisioned to be within the scope of this invention.

A proximity sensor is a non-contacting device for detecting the presence or absence of an object. Proximity sensors presently in use are of the following types:

a) Capacitive
b) Inductive
c) Photoelectric
d) Ultrasonic
e) Microwave Doppler (Motion)

It is the purpose of the new millimeter wave (frequency greater than 30 GHz) active proximity sensor, herein disclosed, to provide short range (fraction of an inch to a few feet) sensing capability in a harsh environment, said capability not being presently available with known proximity sensors. The new features of the millimeter wave sensor are as follows:

1) A means for short range proximity sensing in harsh industrial or natural environments such as dust (e.g. grainery, mines), smoke, fog, vapor (e.g. degreaser, steam, hydrocarbon exhaust), hydrocarbon fluids (oil, grease), cleaning liquids or sprays (hydrocarbon or organic based, e.g. carbon tetrachloride, benzene, xylene, trichlorethylene), dirt, flames (fire fighting, furnaces).

An inductive type proximity sensor may be used in a harsh environment but it lacks in sensor range (0.6 inches max.). The inductive sensor is also known to detect only metallic objects and that an increase in target size will not produce an increase in sensing range. The disclosed millimeter wave proximity sensor of the present invention provides at least a 6 times increase in detection range, relative to an inductive sensor, and its sensing range increases with target size, as shown by the graph in FIG. 1. In addition, the millimeter wave proximity sensor can detect a variety of materials, including metals, dielectrics and various liquids.

Capacitive sensors have a greater range (1.6 inches max.) than an inductive sensor, as disclosed in *The Basics of Inductive and Capacitive Proximity Presence Sensing*, Eaton Corp. Milwaukee, Wis., but are unsuitable for harsh environments due to the very significant and unacceptable effect that a harsh environment has on the operating mechanism of a capacitive sensor. Photoelectric and ultrasonic sensors rely on a non-absorbing and non-dispersive medium between their respective transmitter and the object to be detected. Most harsh environments are absorptive and dispersive, and hence are unsuitable for an ultrasonic or photoelectric proximity sensor. By contrast, the harsh environments previously exemplified are essentially transparent to millimeter wave electromagnetic radiation and the millimeter wave proximity sensor of the present invention can function effectively in said environments to detect the presence or absence of an object.

Doppler based microwave or millimeter wave sensors are intended for far field detection rather than near field (short range) detection an object in motion and not for the detection of a stationary object. The Doppler type sensor is also not suitable for slow motion sensing due to detection sensitivity limitations incurred by the return signal being in a frequency region very close to the transmitter frequency. The signal frequency offset from the carrier decreases as the speed of the object in motion decreases.

2) A means to provide uniform detected output of an object arbitrarily located in the spatial range of the millimeter wave proximity sensor herein disclosed.

The sensor operational range is in what is known as the near field region of the transmitter output. There is a known spatial non-uniformity of the electromagnetic field in this near field region as the output of the transmitter transitions from the transmitter output waveguide port to free space. The radiated wave is non-planar in the near field region. (It transitions to a plane wave in the far field.) Due to the non-uniform spatial field distribution, it is known that sensor detection nulls from an object will be experienced at some locations in the spatial range of the sensor. A unique feature of the disclosed proximity sensor is a means to alleviate these detection nulls.

3) A means to provide a low cost transmitter source for the disclosed sensor. It is based on a new Gunn diode oscillator circuit with the following novel features:

A means for self frequency compensation with temperature.

Elimination of the need for an output isolator that is conventionally required to prevent excessive frequency change, frequency discontinuity or performance drop out with changes in output load.

Elimination of the need for a matching circuit between the output waveguide and the oscillator circuit. A matching circuit is conventionally used to ensure maximum output power to the load.

Use of the Gunn oscillator output waveguide directly as a slot type antenna, thereby eliminating the need for an external antenna.

Use of a Gunn oscillator waveguide circuit that has been reduced to an elemental form. The discrete circuit elements are a Gunn diode and a chip capacitor.

One of the objects of this invention is to provide a low power, low cost, millimeter wave (MMW) proximity sensor that provides over a 6:1 increase in minimum detection range (55 mm minimum) compared to standard 18 mm inductive proximity sensors. The design preferably includes a low cost MMW Gunn oscillator, MMW detector and analog processing/driver circuitry. The sensor is preferably designed for 3-wire operation and will fit in a standard 18 mm tube.

An initial cost analysis of the sensor assembly has been completed and results indicate that a manufactured cost of less than $100, in quantities of greater than 10,000, can be achieved.

The sensor provides approximately a 6:1 improvement in minimum detection range compared to 18 mm inductive sensors. For an 18 mm target, a standard 18 mm inductive sensor would provide 9 mm of sensing range as compared to the MMW sensor which will provide 55 mm of sensing range. An important difference between the MMW proximity sensor and conventional inductive sensor technology is that the sensing range of the present invention is a function of target size. Therefore, the sensing range of the proximity sensor of the present invention will be significantly greater for larger targets (i.e. >30:1 improvement for a 100 mm target).

A perspective view of the low cost, low power, MMW Gunn oscillator of the present invention is presented in FIG. 4. A simple monopole element is used as both the tuning circuit and interface between the Gunn diode and the output of the sensor. This greatly simplifies the circuit topology and therefore the assembly cost. This simple, robust circuit design results in a low manufactured cost and eliminates any need for circuit alignment. Two breadboarded oscillators both achieved 10 dBm output power at 35 GHz, thus meeting a 0 dBm nominal output power design goal. Excellent repeatability was observed from breadboard to breadboard.

A perspective view of the low cost MMW detector circuit of the present invention is shown in FIG. 5. The circuit was realized using a simple printed circuit and a low cost, commercially available, GaAs Schottky diode which was designed for pick and place type assembly. This resulted in an extremely simple, highly produceable, low cost circuit. Two breadboarded MMW detector circuits provided good sensitivity and very flat performance over the 30 to 37 GHz frequency range, thereby permitting a decrease in the oscillator frequency accuracy. Excellent repeatability was observed from breadboard to breadboard.

The MMW proximity sensor and a photoelectric sensor product manufactured by Eaton Corporation are similar from a functional point of view. Due to this similarity, the Eaton photoelectric ASIC was able to be used in the analog processing/driver circuitry of the present invention. This greatly reduces the circuit complexity and therefore reduces the manufactured cost. A breadboard of the analog processor/driver circuits was built and evaluated. Initial results looked excellent and the board met all design goals. A top plan view of the analog processor/driver board is presented in FIG. 6.

It has been determined from a review of the OSHA regulations for the sensor that the sensor meets all requirements for safe operation. Initial discussions with the FCC indicate that this frequency band is not currently regulated, but a site license may be required to track usage of this frequency band.

In accordance with one form of the invention, an electromagnetic wave, reflective type, active proximity sensor comprises:

a transmitter for transmitting radiated energy to a target, the transmitter including a Gunn oscillator circuit, the Gunn oscillator circuit including a Gunn oscillator and a Gunn driver coupled to the Gunn oscillator, the Gunn oscillator, driven by the Gunn driver, generating a pulse modulated signal which is radiated by the transmitter to the target;

a receiver, the receiver including first and second waveguides and first and second detectors respectively coupled to the first and second waveguides, the first and second waveguides receiving radiated energy reflected from the target and providing the radiated energy to the first and second detectors, respectively, each of the first and second detectors generating an output signal which corresponds to the radiated energy received by the first and second waveguides, the receiver further including a summer, the summer being coupled to the first and second detectors and being responsive to the output signals of the first and second detectors, the summer generating an output signal corresponding to the sum of the output signals of the first and second detectors; and an analog processor/driver circuit, the analog processor/driver circuit being responsive to the output signal of the summer, the processor/driver circuit including a pulse modulator generating a pulsed signal and providing the pulsed signal to the Gunn driver, an amplifier receiving the output signal of the summer and generating an amplified signal in response thereto, a synchronized demodulator signal conditioner being responsive to the amplified signal and generating an output signal in response thereto, and an output stage responsive to the output signal from the synchronized modulator signal conditioner and generating an output signal in response thereto.

A comprehensive description of the preferred form of the proximity sensor is presented in the following section, with reference to the drawings.

DETAILED DESCRIPTION OF THE PREFERRED EMBODIMENTS

Figure 1:
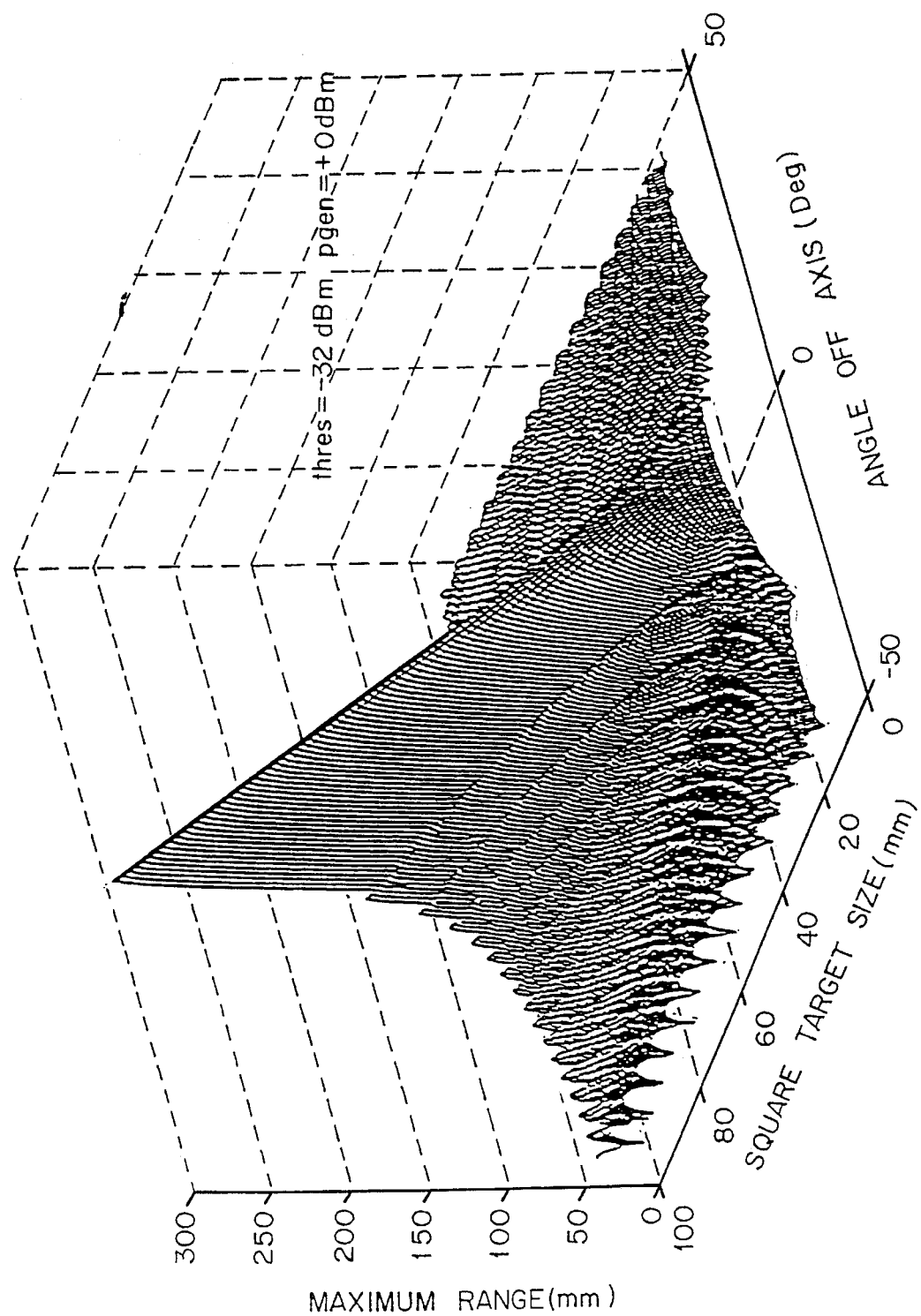
FIG. 1 is a graph in three dimensions of the maximum range vs. target size and angle off axis for a conventional proximity sensor.
Figure 2:
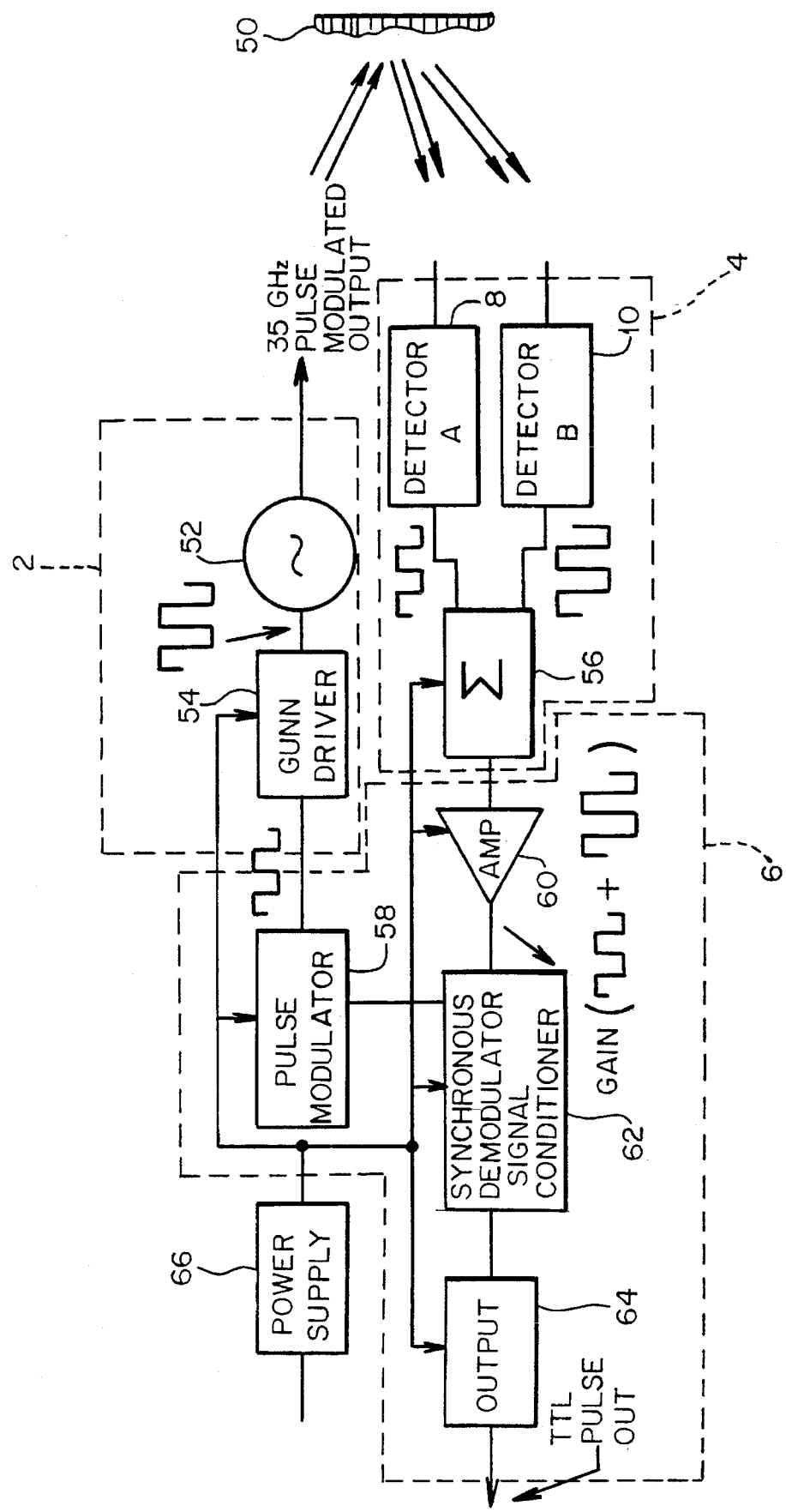
FIG. 2 is a block diagram of the millimeter wave proximity sensor formed in accordance with one form of the present invention.
Figure 3:
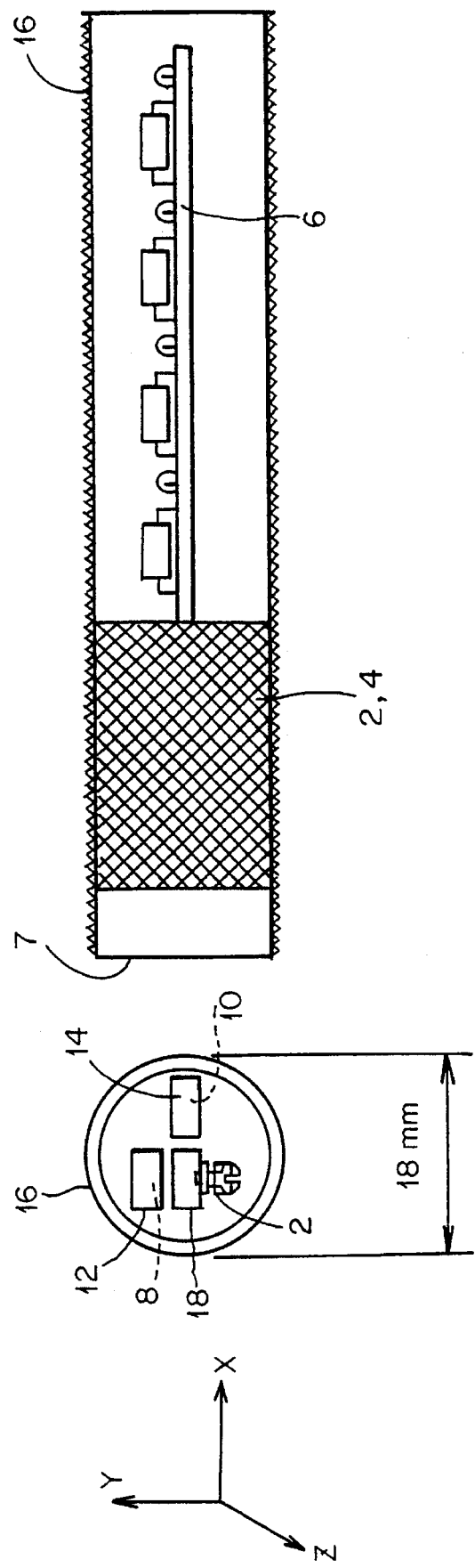
FIG. 3a is an assembly drawing, including an end view, of the millimeter wave proximity sensor of the present invention.
FIG. 3b is an assembly drawing, including a side view, of the millimeter wave proximity sensor of the present invention.
Figure 4:
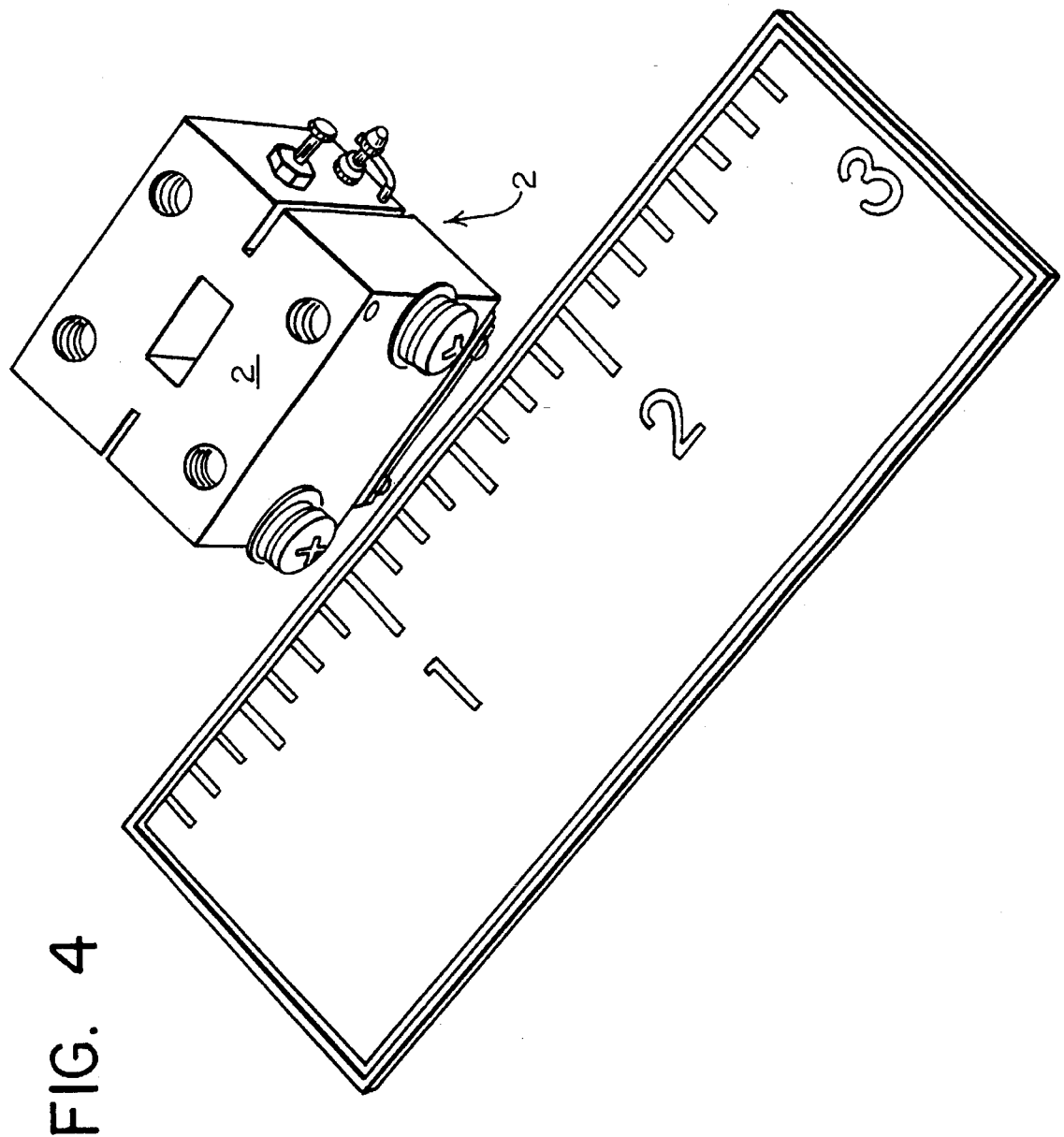
FIG. 4 is a perspective view of a first subassembly, namely, the Gunn oscillator, of the millimeter wave proximity sensor of the present invention.
Figure 5:
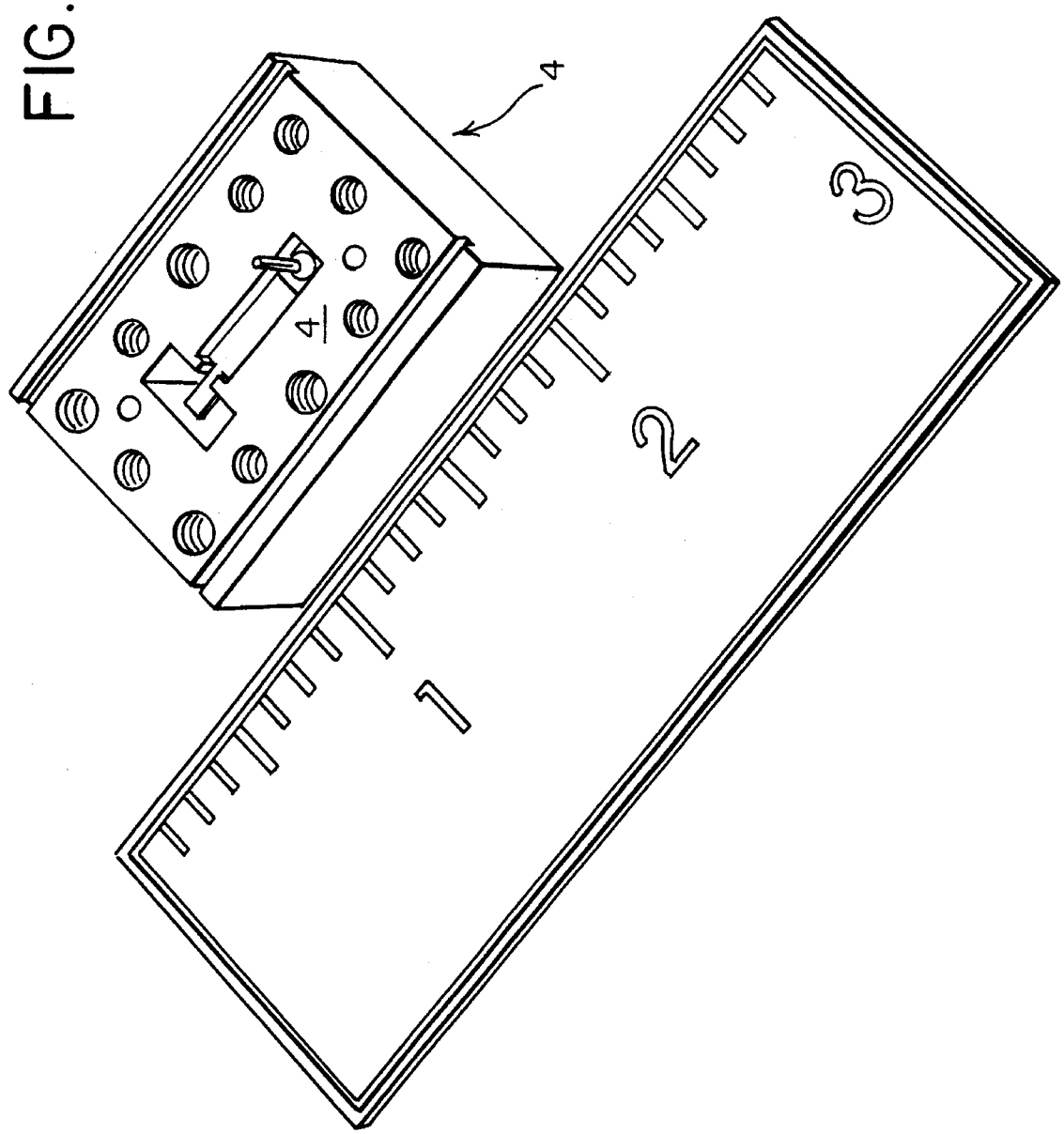
FIG. 5 is a perspective view of a second subassembly, namely, the detector, of the millimeter wave proximity sensor of the present invention.
Figure 6:
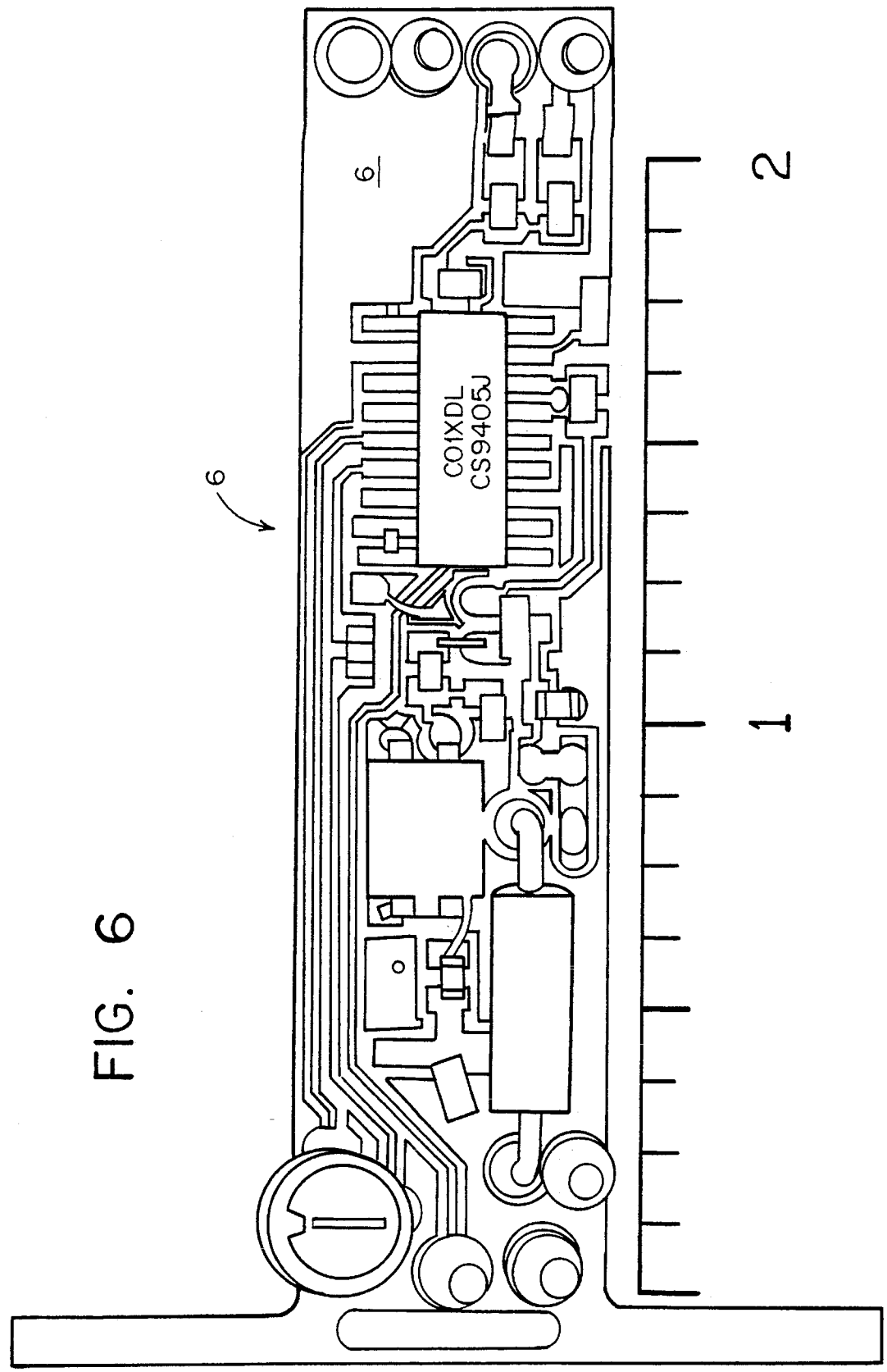
FIG. 6 is a top plan view of a third subassembly, namely, the analog processor/driver, of the millimeter wave proximity sensor of the present invention.
Figure 9A:
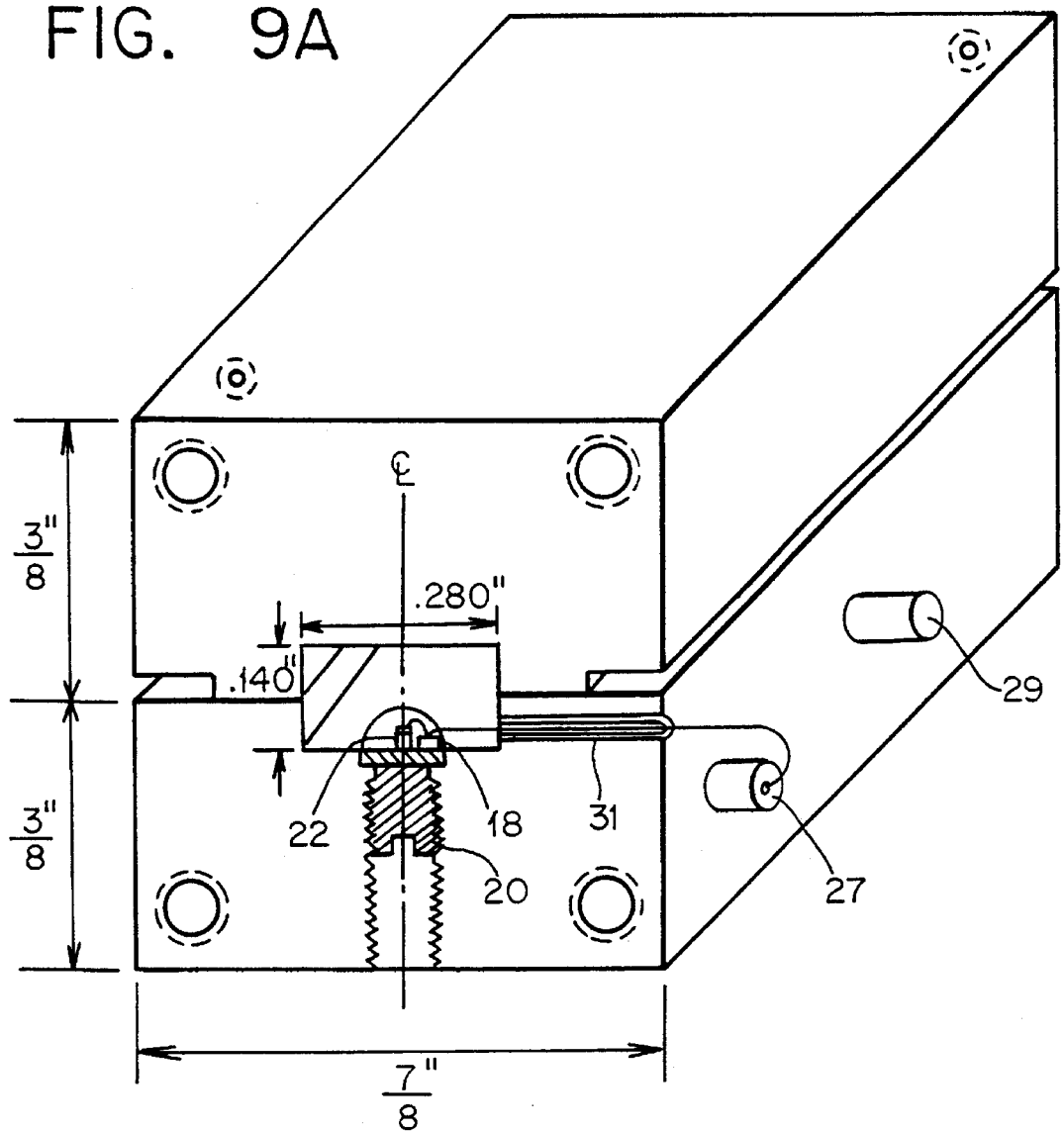
FIG. 9a is an isometric assembly drawing of the Gunn oscillator circuit of the millimeter wave proximity sensor of the present invention.
Figure 9B:
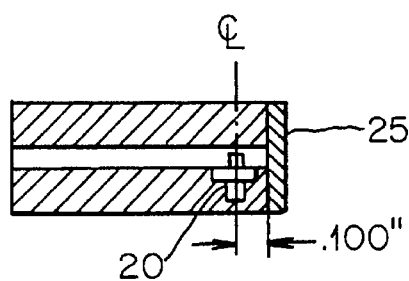
FIG. 9b is a cross-sectional view of the Gunn oscillator circuit of the millimeter wave proximity sensor of the present invention.

A block diagram and assembly drawing of the millimeter wave proximity sensor of one form of the present invention are shown in FIGS. 2 and 3. Views of the three sub-assemblies constituting the sensor, namely, the Gunn oscillator 2, detector circuit 4 and analog processor/driver 6 are shown in FIGS. 4–6. Details of the Gunn oscillator circuit 2 are shown in FIGS. 7a through 7c and 8a through 8d, and an assembly drawing of the Gunn oscillator 2 is shown in FIG. 9a and FIG. 9b.

Referring initially to FIG. 2 of the drawings, and in accordance with one form of the invention, an electromagnetic wave, reflective type, active proximity sensor includes a transmitter for transmitting radiated energy to a target 50, the transmitter including a Gunn oscillator circuit 2, the Gunn oscillator circuit including a Gunn oscillator 52 and a Gunn driver 54 coupled to the Gunn oscillator 52. The Gunn oscillator 52, driven by the Gunn driver 54, generates a pulse modulated signal which is radiated by the transmitter to the target 50.

The electromagnetic wave proximity sensor also includes a receiver, the receiver including first and second waveguides 12,14, and first and second detectors 8,10 respectively coupled to the first and second waveguides 12,14. The first and second waveguides 12,14 receive radiated energy reflected from the target 50 and provide the radiated energy to the first and second detectors 8,10, respectively. Each of the first and second detectors 8,10 generates an output signal which corresponds to the radiated energy received by the first and second waveguides 12,14. The receiver further includes a summer 56, the summer being coupled to the first and second detectors 8,10 and being responsive to the output signals of the first and second detectors. The summer 56 generates an output signal corresponding to the sum of the output signals of the first and second detectors 8,10.

The electromagnetic wave proximity sensor also includes an analog processor/driver circuit 6. The analog processor/driver circuit is responsive to the output signal of the summer 56. The processor/driver circuit 6 includes a pulse modulator 58 generating a pulsed signal and providing the pulsed signal to the Gunn driver 54, an amplifier 60 receiving the output signal of the summer 56 and generating an amplified signal in response thereto, a synchronized demodulator signal conditioner 62 being responsive to the amplified signal and generating an output signal in response thereto, and an output stage 64 responsive to the output signal from the synchronized modulator signal conditioner 62 and generating an output signal in response thereto. The output stage 64 provides a TTL pulsed output signal or in another logic compatible format to interface properly with external circuitry. The output stage may be Eaton Corporation Part No. 109905 and the rest of processor 6 may be Eaton Corporation Part No. 109744. Also, a power supply 66 may be included to power the various components of the sensor.

The sensor is preferably designed to operate at the millimeter wave frequency of 35 GHz. A Gunn diode is used as the active element in a pulsed oscillator that is used as a transmitter. The pulsed 35 GHz signal is radiated into the target area that is designed to extend from the face of the transmitter to a distance of approximately 12 inches. When an object is in the target region, the transmitted signal is reflected back to the two detectors 8,10 contained in the two receive waveguides 12,14 in the sensor housing 16, as shown in FIG. 3a and FIG. 3b. Further, also shown in FIG. 3b, a dielectric cover 7 is mounted on the sensor housing 16 at the face of the sensor.

The target area of the sensor is in the near field region of the transmitter. It is known that in this close-in region there is a non-uniform spatial distribution of electromagnetic field as transmitter output transitions from the output waveguide port 18 of the transmitter to free space. It is also known that sensor detection nulls may result from the non-uniform spatial field distribution for an object in some locations of the sensing range. A unique feature of the sensor is the use of two detectors 8,10 in a two dimensional receive array (FIG. 3a and FIG. 3b) to alleviate the detection nulls in the near field region. The output of the detectors are series connected and summed. The location of each detector in different X and Y coordinates at the sensor face ensures that if one detector experiences a detection null the other will have detected output and the series connected composite output will have a satisfactory level of output for sensor processing. Two receive waveguides 12,14 in different spatial locations, each with its own detector, are used to eliminate the null condition.

Alternate means to eliminate any detection nulls in the spatial range of the sensor are to use a FSK (frequency shift keying) or broadband noise modulated transmitter source rather than the fixed frequency Gunn diode source as previously described. With FSK modulation, the RF frequency of the transmitter is shifted rapidly between one of two frequencies. Hence, should a null detection condition exist at one frequency in the spatial frequency range of the sensor, it would not be present at the second frequency. A broadband noise modulated transmitter source would also provide an output with varying frequency content and would eliminate a detection null in the spatial range of the sensor in the manner described for FSK modulation. With FSK or broadband noise modulation it would be possible to use one receiver rather than the two receiver configuration as previously described for a fixed frequency Gunn oscillator.

Another means to eliminate detection nulls in the spatial range of the sensor is to chirp the output of the pulsed Gunn oscillator 2 over the width of the output RF pulse. As previously described for the two receiver sensor configuration, pulsing of the RF output of the Gunn diode is accomplished by pulsing the bias voltage applied to the Gunn diode. A train of rectangular bias voltage pulses drives the Gunn diode bias from zero to a constant value of operating voltage during the width of the pulse. The RF frequency is constant over the duration of the pulse since bias voltage is constant. In order to chirp the output frequency, pulsed bias voltage that is not constant in amplitude is preferably used (e.g. trapezoidal pulse). Chirping of output frequency results from the known pushing characteristic of a Gunn oscillator (and other oscillator types) and is manifest by a change in oscillator frequency with the magnitude of the applied bias voltage. Hence, with a chirped sensor transmitter output, the sensor receiver would not experience a detection null since if a detection null occurs at a particular frequency, a null would not be present over the range of the other frequencies constituting the frequency chirp. With this chirp technique, it would be possible to use one receiver for the proximity sensor rather than the two receiver configuration previously described.

RF leakage from the transmitter output waveguide port 18 directly into the receiver waveguide ports 12,14 is minimized by optimizing the longitudinal position of the transmitter port relative to the receiver ports. Minimizing the RF leakage will maximize the tangential sensitivity of the receiver.

The 35 GHz transmitter source used in the sensor uses a Gunn diode as the active element in a novel oscillator circuit. The novel features of the Gunn diode oscillator 2 were previously delineated and a detailed description of the oscillator circuit is to follow.

Figure 7B:
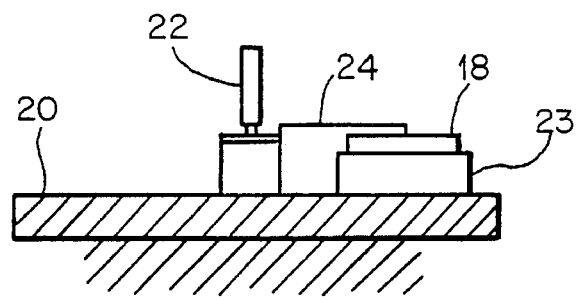
FIG. 7b is a side view of the Gunn oscillator circuit of the millimeter wave proximity sensor of the present invention.
Figure 7C:
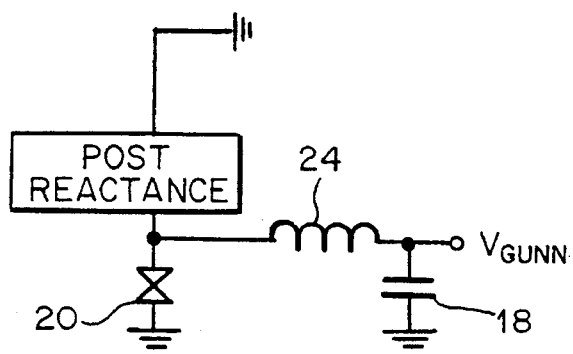
FIG. 7c is an equivalent schematic of the Gunn oscillator circuit of the millimeter wave proximity sensor of the present invention.
Figure 7A:
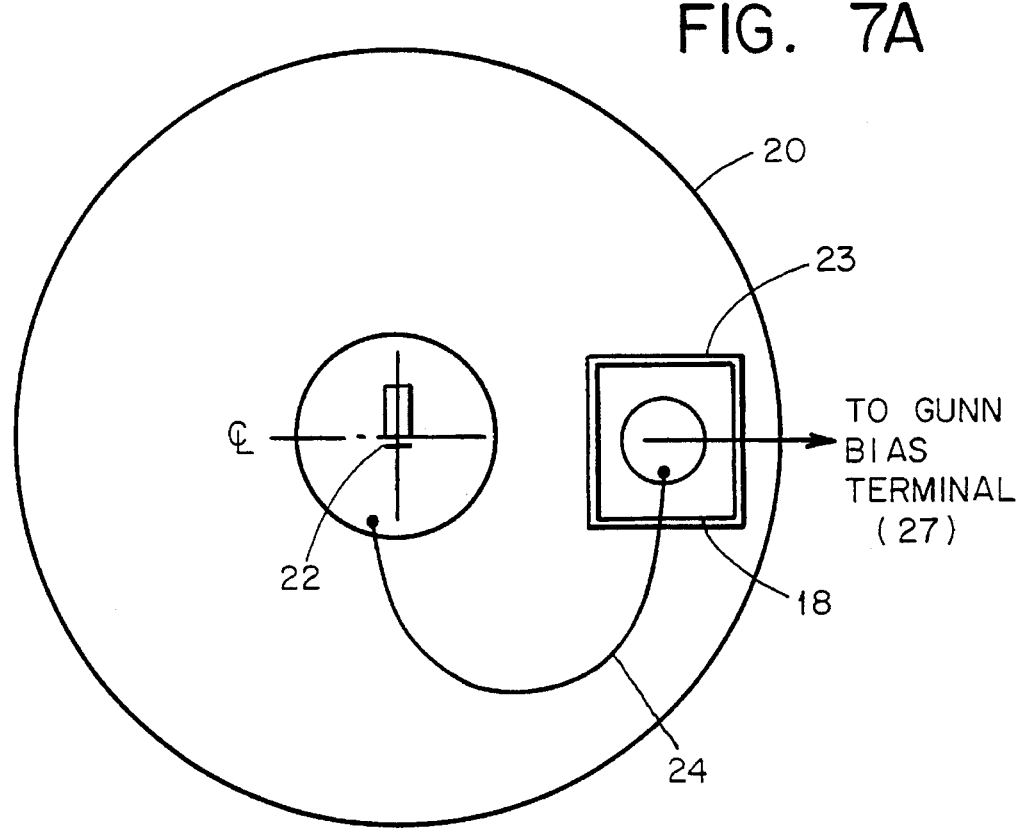
FIG. 7a is a top view of the Gunn oscillator circuit of the millimeter proximity sensor of the present invention.
Figure 8A:
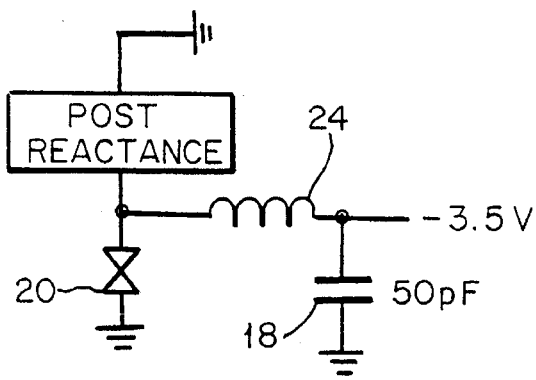
FIG. 8a is an equivalent schematic of the Gunn oscillator circuit of the millimeter wave proximity sensor of the present invention.
Figure 8B:
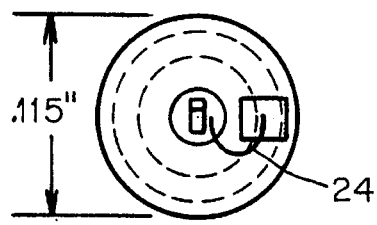
FIG. 8b is a top view of the Gunn oscillator circuit of the millimeter wave proximity sensor of the present invention.
Figure 8C:
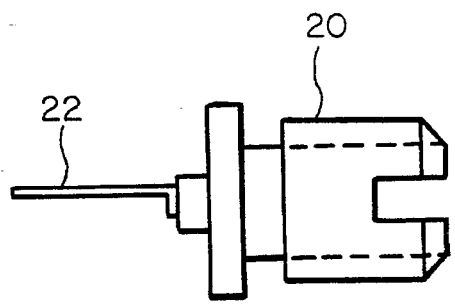
FIG. 8c is a side view of the Gunn oscillator circuit of the millimeter wave proximity sensor of the present invention.
Figure 8D:
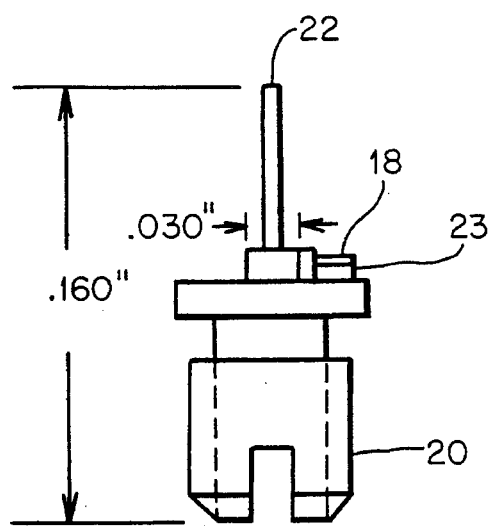
FIG. 8d is another side view of the Gunn oscillator circuit of the millimeter wave proximity sensor of the present invention.

A circuit diagram and circuit layout of the oscillator 2 are presented in FIGS. 7a through 7c and 8a through 8d. A perspective view of the assembled oscillator is shown in FIG. 4 and an assembly drawing is shown in FIG. 9a and FIG. 9b. The elemental form of the oscillator is evident from the small size of the oscillator circuit and the low parts count. The discrete circuit elements are a standard packaged Gunn diode 20 and a chip capacitor 18. As illustrated in FIG. 7a and FIG. 7b, the chip capacitor 18 is mounted on the Gunn diode 20 with a copper spacer 23 positioned therebetween. A thin and narrow metal post 22 (e.g. 006"×0.008") is bonded to the 0.030" diameter top cap of the Gunn diode 20. All the elements of the oscillator circuit are bonded to the Gunn diode and contained within its 0.115 inch flange diameter. The post 22 is sized such that its reactance in combination with Gunn diode and circuit reactances present a resonant circuit to the negative resistance of the Gunn diode 20 at the 35 GHz frequency of oscillation. It is preferred if the post 22 does not contact the top wall of the waveguide embodiment. Post length is a primary determinant of oscillator frequency. The shorter the length of the post, the higher is the oscillation frequency.

Figure 10B:
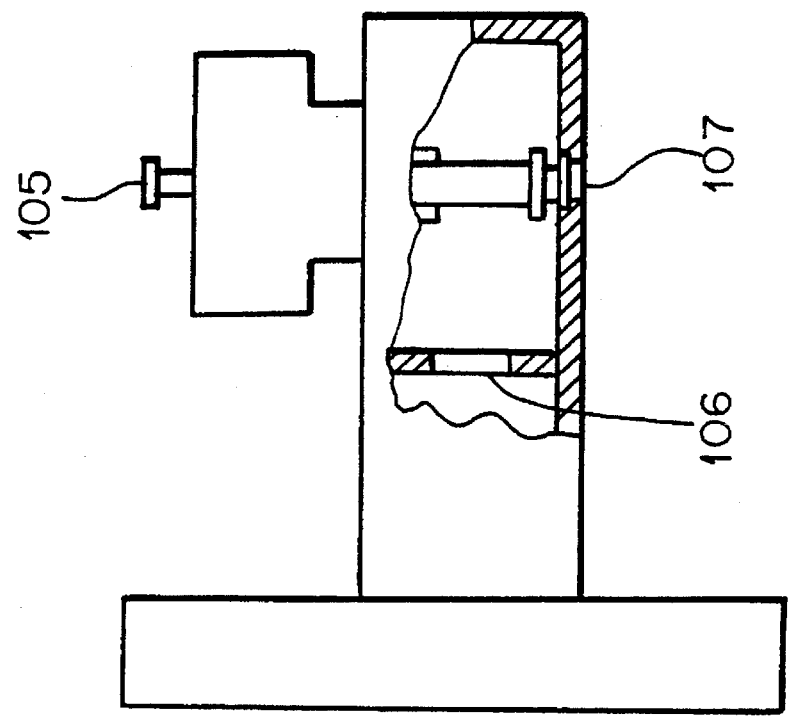
FIG. 10b is a side view, partially broken away, or a conventional Gunn oscillator circuit.
Figure 10A:
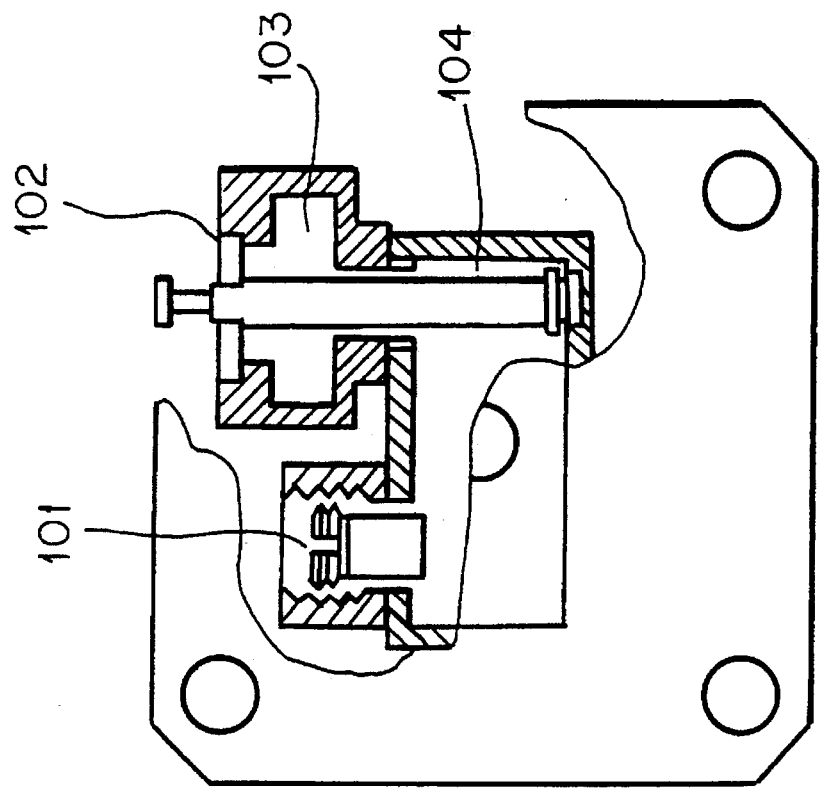
FIG. 10a is a front view, partially broken away, of a conventional Gunn oscillator circuit.

The length of the line 24 connecting the Gunn diode and the chip capacitor is nominally one quarter wavelength, and in combination with the chip capacitor constitutes a low pass filter for applying bias voltage to the Gunn diode FIG. 9a also illustrates the location and connectivity of the Gunn bias terminal 27 to the oscillator circuit via microcoax 31. Also shown in FIG. 9a is the location of the ground terminal 29 of the oscillator circuit. This arrangement is novel and different from that used in conventional Gunn oscillators, such as disclosed in *Gunn Diode Circuit Handbook*, No. HB-9000, Microwave Associates, where bias is applied to the Gunn diode via a metal post that contacts the top cap of Gunn diode and extends through and is insulated from the top wall of the waveguide. The portion of the post extending outward from the top wall is fabricated as a coaxial line with low and high impedance quarter wave sections that constitute a low pass filter for applying basis to the Gunn diode. This conventional biasing arrangement is illustrated in FIG. 10a and FIG. 10b and is from the *Gunn Diode Circuit Handbook* referenced above The conventional biasing arrangement, as illustrated in FIG. 10, includes a tuner 101, a bypass 102, a choke 103, a post coupling 104, a bias point 105, an iris hole 106 and a diode 107. This biasing arrangement is more complex and expensive to fabricate and assemble than the chip capacitor arrangement, disclosed herein, and therefore is unsuitable for an oscillator where low cost is a primary objective. In addition, the non-contacting nature of the post 22 to the top wall of the waveguide in the present invention provides a simple means by which the oscillator can be provided with self-compensation of the frequency change that is known to occur with oscillators due to changes in temperature. Frequency compensation with temperature change is accomplished in the following manner.

If the post 22 in the present invention was of the same material as the waveguide embodiment (e.g. copper), the gap between the top wall of the waveguide and the top of the post would increase with temperature due to the difference in length between the height of the waveguide and the height of the post. An increase in gap size has been measured to result in an increase in oscillator frequency. Simultaneous with this thermal expansion is the expansion of the waveguide length between the post and the fixed back short 25 (FIG. 9b) which causes a decrease in oscillator frequency. These effects are not offsetting and the net effect is for oscillator frequency to decrease with increasing frequency. Self frequency compensation is obtained by making the post 22 of a material with a lower coefficient of thermal expansion than that of the waveguide. For example, for a copper waveguide the coefficient of thermal expansion is $16.8 \times 10^{-6}/°C$. and for a post made of Invar the coefficient is $0.9 \times 10^{-6}/°C$. Thus, for a copper waveguide circuit embodiment with an Invar post, the gap between the top wall of the waveguide and the post will be larger with a temperature increase than that with a copper post. The larger gap will produce a larger increase in oscillator frequency relative to that with a copper post and will offset the decrease in frequency that is characteristic of the uncompensated oscillator. Frequency/temperature compensation in this new oscillator circuit is accomplished without the addition of any additional parts to the uncompensated oscillator.

The measured external Q factor of the oscillator 2 was 110. The measured output power of several oscillators indicates that the oscillators are critically coupled (matched) to the output waveguide load. Conventional Gunn oscillators use an appropriately spaced coupling iris at the output port of the oscillator to match the oscillator to the output load, as shown in FIG. 10b. The oscillator of the present invention described herein does not require a coupling iris or any other matching network to establish a matched condition. The matched condition required for maximum output power is indicated to be inherent to the oscillator circuit. The Gunn diodes used in these oscillators were tested by the vendor in their standard critically coupled (matched) cavity oscillator. The output power measured by the vendor under these conditions was near equal to the output power measured in the oscillator circuit disclosed herein.

Testing also indicated that the oscillator 2 could be operated without any external isolation between the load and the oscillator (e.g. ferrite isolator) into high VSWR loads (at least 4.5:1) without significant disturbance of oscillator performance. With a low VSWR load (1.22), the pulling of the oscillator was ±30 MHz, corresponding to 0.094% of oscillation frequency (35 GHz). Pulling of an oscillator is the change in oscillator frequency that results when a load of a given VSWR is changed through all phase (±180 degrees). The good pulling characteristics of the oscillator is indicated as also being intrinsic to the oscillator circuit.

Figure 11:
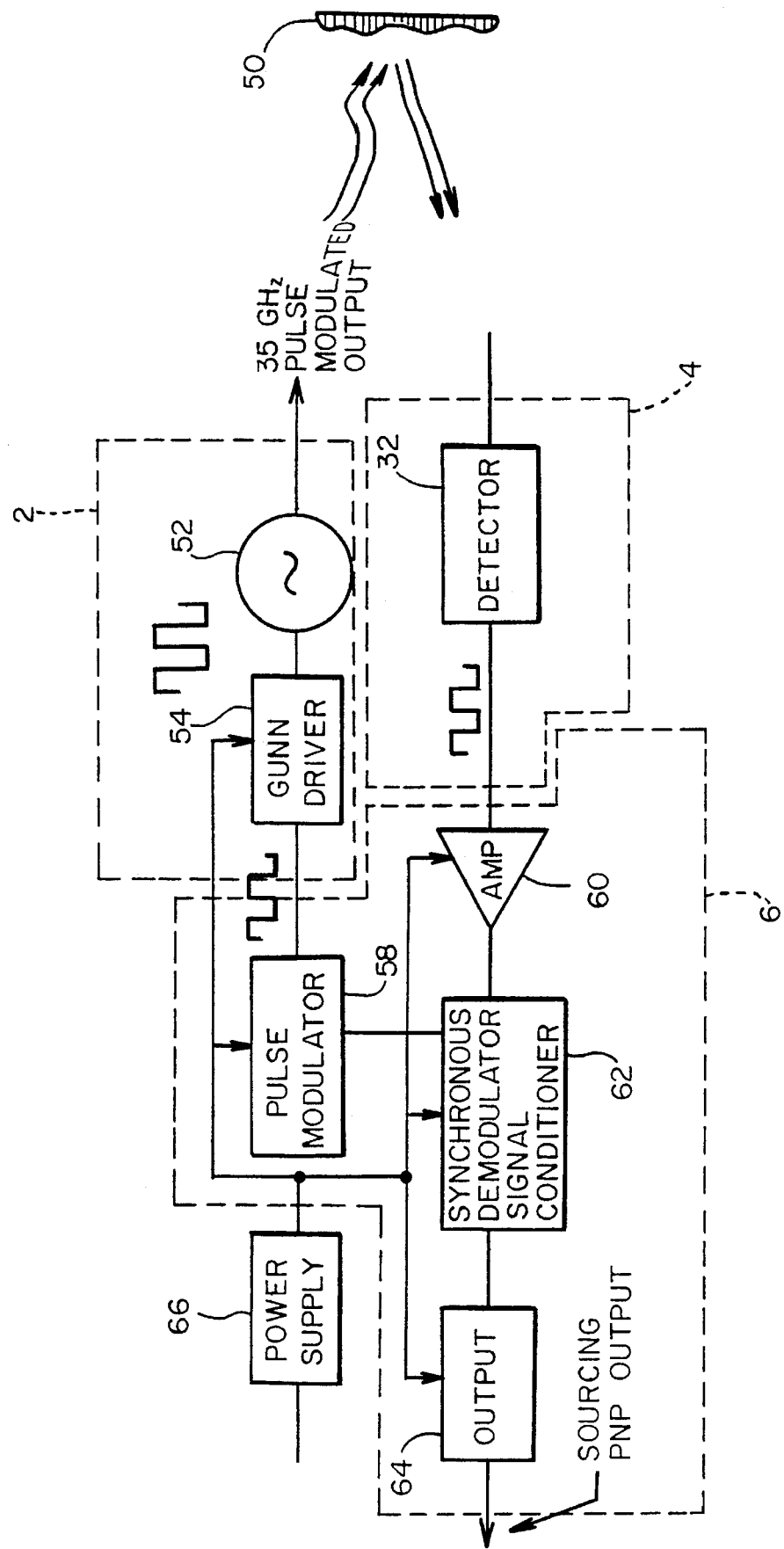
FIG. 11 is a block diagram of another form of the proximity sensor of the present invention.

The millimeter wave proximity sensor design of the present invention described previously has been modified in a further embodiment of the present invention for the purpose of increasing its detection sensitivity and simplifying its form which decreases its cost and size. Whereas the previously described design used two waveguide receivers 12,14, each with a millimeter wave detector 8,10, the new upgraded configuration contains only one waveguide receiver 30 and one millimeter wave detector 32. Block diagrams and layouts of this alternative embodiment of the proximity sensor and that which was previously disclosed are shown in FIGS. 11 and, 12a and 12b and FIGS. 2 and, 3a and 3b, respectively. The design shown in FIGS. 11 and, 12a and 12b, the one receiver configuration, is the preferred form for the proximity sensor. A larger waveguide (WR-28) 34 is used for the transmitter than is used for the receiver (WR-22) 30 for the 35 GHz prototype sensor in order to narrow the transmitter beamwidth and thereby obtain a larger target return and minimize false target returns.

The new configuration (FIGS. 11 and, 12a and 12b) is simpler, lower cost and exhibits higher detection sensitivity than the previously disclosed design (FIGS. 2 and, 3a and 3b). The increase in detection sensitivity follows from the use of a unique means to decrease to an insignificant level the transmitter signal that leaks directly into the receiver waveguide port 30. Said leakage is significantly less than that experienced with the previous design using two receivers 12,14 (FIGS. 2 and, 3a and FIG. 3b). The leakage of transmitter signal into the receiver port(s) deteriorates sensor performance since it limits the minimum level of target return that can be detected. In addition, it is known that transmitter to receiver leakage contributes to the amplitude of the ripple that is present in normal sensor operation as a function of sensor to target distance. Since ripple amplitude limits the performance capability of the sensor (e.g. range setability, hysteresis), it is preferred that transmitter to receiver leakage be reduced to an insignificant level.

Figure 13:
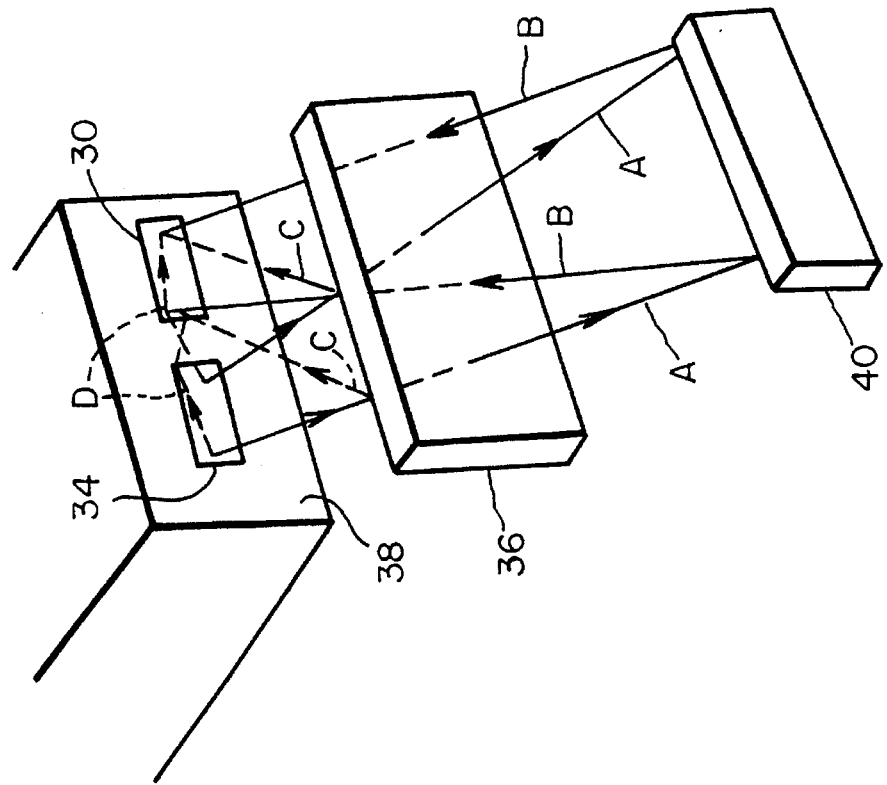
FIG. 13 is a perspective view of the proximity sensor of the present invention shown in FIGS. 11 and 12.

The means used to desensitize the sensor from the effects of transmitter to receiver leakage is shown in FIG. 13. A dielectric beam splitter 36 is spaced approximately a quarter wavelength from the transmitter and receiver waveguide ports 34,30 in the face 38 of the sensor housing. A direct leakage path from the transmitter to the receiver port is shown by dashed line D, said leakage resulting in a degradation of sensor performance. The main beam from the transmitter (solid line A) impinges upon the beam splitter 36 which is a low loss dielectric plate (e.g. Lexan). Most of the transmitter signal passes through the plate to the target 40. The target return to the receiver port is shown by solid line B. A small portion of the main beam is reflected back to the receiver port 30 (dashed line C). The plate thickness is approximately half wavelength in the dielectric and is sized to provide the desired level of reflected signal. With the dielectric plate 36 spaced near a quarter wavelength from the receiver port 30, the reflected energy is 180° out of phase with the direct leakage signal and hence, nullifies the effect of the transmitter leakage on sensor performance. The effective isolation between transmitter and receiver ports 34,30 has been measured to be more than 40 dB with this means of leakage suppression.

It should be noted that although the design of the proximity sensor was described at 35 GHz, the design can be implemented at any millimeter wave, submillimeter wave or microwave frequency. In addition, although the design described used a Gunn diode as the active element, other active elements such as Impatt diode, FET or HEMT devices can also be used.

Figures 12A, 12B:
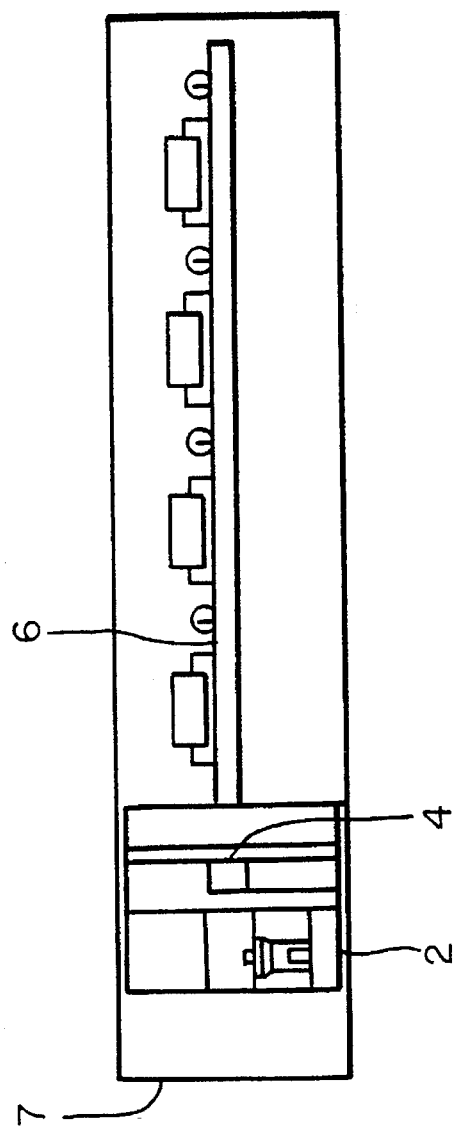
FIG. 12a is an end view of the form of the proximity sensor shown in FIG. 11.
FIG. 12b is a side view of the form of the proximity sensor shown in FIG. 11.

With regard to the potential for detection nulls (detected output minimums) due to the spatial non-uniformity of the electromagnetic field in the field region near the transmitter output port, such nulls are not a concern as a consequence of the increased detection sensitivity provided by the sensor design shown in FIGS. 11–13. In the previous design (FIGS. 2 and, 3a and 3b) two receivers were used to avoid detection nulls. The outputs of the two receivers were combined to offset the degradation in detection sensitivity of each receiver due to the lack of transmitter to receiver leakage suppression.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. An electromagnetic wave, reflective type, active proximity sensor, which comprises:

a transmitter for transmitting radiated energy to a target, the transmitter including a Gunn oscillator circuit, the Gunn oscillator circuit including a Gunn oscillator and a Gunn driver coupled to the Gunn oscillator, the Gunn oscillator, driven by the Gunn driver, generating a pulse modulated signal which is radiated by the transmitter to the target;

a receiver, the receiver including first and second waveguides and first and second detectors respectively coupled to the first and second waveguides, the first and second waveguides receiving radiated energy reflected from the target and providing the radiated energy to the first and second detectors, respectively, each of the first and second detectors generating an output signal which corresponds to the radiated energy received by the first and second waveguides, the receiver further including a summer, the summer being coupled to the first and second detectors and being responsive to the output signals of the first and second detectors, the summer generating an output signal corresponding to the sum of the output signals of the first and second detectors; and an analog processor/driver circuit, the analog processor/driver circuit being responsive to the output signal of the summer, the processor/driver circuit including a pulse modulator generating a pulsed signal and providing the pulsed signal to the Gunn driver, an amplifier receiving the output signal of the summer and generating an amplified signal in response thereto, a synchronized demodulator signal conditioner being responsive to the amplified signal and generating an output signal in response thereto, and an output stage responsive to the output signal from the synchronized modulator signal conditioner and generating an output signal in response thereto.

* * * * *